(12) United States Patent
Senalp et al.

(10) Patent No.: US 9,424,694 B2
(45) Date of Patent: Aug. 23, 2016

(54) ASSESSING PERFORMANCE OF A SYSTEM

(71) Applicant: BAE SYSTEMS plc, London (GB)

(72) Inventors: Erdem Turker Senalp, South Gloucestershire (GB); Richard Lee Bovey, South Gloucestershire (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/413,989

(22) PCT Filed: Jul. 10, 2013

(86) PCT No.: PCT/GB2013/051831
§ 371 (c)(1),
(2) Date: Jan. 9, 2015

(87) PCT Pub. No.: WO2014/013226
PCT Pub. Date: Jan. 23, 2014

(65) Prior Publication Data
US 2015/0170442 A1    Jun. 18, 2015

(30) Foreign Application Priority Data

Jul. 16, 2012   (GB) .................................. 1212617.3

(51) Int. Cl.
*G07C 5/08* (2006.01)
*G06Q 10/06* (2012.01)
*G05B 23/02* (2006.01)

(52) U.S. Cl.
CPC .......... *G07C 5/0808* (2013.01); *G05B 23/0254* (2013.01); *G06Q 10/063* (2013.01); *G06Q 10/0639* (2013.01)

(58) Field of Classification Search
CPC ............... G07C 5/0808; G06Q 10/063; G06Q 10/0639; G05B 23/0254

USPC ......................................................... 701/29.1
See application file for complete search history.

(56) References Cited

U.S. PATENT DOCUMENTS

| 7,720,779 | B1 | 5/2010 | Perry et al. | |
| 2004/0010733 | A1* | 1/2004 | Veena | H04L 1/22 |
| | | | | 714/27 |

(Continued)

FOREIGN PATENT DOCUMENTS

| WO | 2014013226 A1 | 1/2014 |
| WO | 2014013227 A2 | 1/2014 |

OTHER PUBLICATIONS

International Search Report and Written Opinion received for Patent Application No. PCT/GB2013/051831, mailed on Nov. 6, 2013. 6 pages.

(Continued)

*Primary Examiner* — McDieunel Marc
*Assistant Examiner* — James E Stroud
(74) *Attorney, Agent, or Firm* — Finch & Maloney PLLC

(57) ABSTRACT

A method of generating probability data for use in assessing performance of a system and a mission involving the system. The method includes receiving (302) a combined model describing a system diagnosis model describing symptoms, failures and link strengths (conditionals) of components/subsystems of the system, and a mission impact model, the mission impact model describing effects of the system on an ability to perform the mission. Observation data regarding a state of the system is also received (306) The observation data is used (308) in combination with the combined model to generate probability data for use in assessing performance of the system and the mission.

20 Claims, 10 Drawing Sheets

(56) References Cited

U.S. PATENT DOCUMENTS

| | | | | |
|---|---|---|---|---|
| 2006/0149990 | A1* | 7/2006 | Veena | H04L 1/22 |
| | | | | 714/1 |
| 2007/0113235 | A1 | 5/2007 | De et al. | |
| 2007/0118502 | A1 | 5/2007 | Aragones et al. | |
| 2011/0208680 | A1* | 8/2011 | Bovey | G06N 7/005 |
| | | | | 706/12 |
| 2012/0215450 | A1* | 8/2012 | Ashok | G05B 23/0262 |
| | | | | 702/9 |
| 2014/0201126 | A1* | 7/2014 | Zadeh | G06K 9/627 |
| | | | | 706/52 |
| 2015/0170442 | A1* | 6/2015 | Senalp | G06Q 10/063 |
| | | | | 701/29.1 |

OTHER PUBLICATIONS

GB Intellectual Property Office Search Report under Section 17(5) and Examination Opinion received for GB Patent Application No. 1212617.3 mailed Nov. 9, 2012. 9 pages.

International Preliminary Report on Patentability and Written Opinion received for Patent Application No. PCT/GB2013/051831, mailed on Jan. 29, 2015. 5 pages.

International Preliminary Report on Patentability and Written Opinion received for Patent Application No. PCT/GB2013/051833, mailed on Jan. 29, 2015. 8 pages.

International Search Report and Written Opinion received for Patent Application No. PCT/GB2013/051833, mailed on Jun. 6, 2014. 13 pages.

GB Intellectual Property Office Search Report under Section 17(5) and Examination Opinion received for GB Patent Application No. 1212616.5 mailed Nov. 14, 2012. 7 pages.

Darwiche, Adnan, "Decomposable Negation Normal Form," Journal of the ACM, vol. 48, issue 4, Jul. 2001. pp. 608-647.

Wachter, et al., "Logical Compilation of Bayesian Networks With Discrete Variables," Symbolic and Quantitative Approaches to Reasoning with Uncertainty; [Lecture Notes in Computer Science], Springer Berlin Heidelberg, Oct. 31, 2007. pp. 536-547.

Schumann, et al., "Computing Optimal Tests for Non-Deterministic Systems Using DNNF Graphs," Electronic Notes in Theoretical Computer Science, vol. 253, issue 2, Oct. 17, 2009. pp. 87-99.

Darwiche, Adnan, "A Compiler for Deterministric, Decomposable Negation Normal Form," Eighteenth National Conference on Artificial Intelligence, Jul. 28, 2002. pp. 627-634.

Wachter, et al., "Reliability and Diagnostics of Modular Systems: A New Probabilistic Approach," Proceedings of DX '06 17th International Workshop on Principles of Diagnosis Penaranda de Duero, Burgos Spain, Jun. 26, 2006. Retrieved from the Internet: URL: http://www.researchgate.net/publication/228631172_Reliability_and_diagnostics_of_modular_systems_a_new_probabilistic_approach/file/79e415086daOae50be.pdf [retrieved on May 16, 2014]. 8 pages.

* cited by examiner

ASSESSING PERFORMANCE OF A SYSTEM

This specification includes a computer program listing appendix provided on CD-ROM as an ASCII text file named 'MISSION.TXT', created on May 26, 2016 and having a size of 16,000 bytes, which is incorporated herein by reference it its entirety.

The present invention relates to assessing performance of a system and a mission that involves the system.

Health Impact Assessment (HIA) concerns the understanding of the current state of the health of a system and its impact on the current and future capability, as well as the safety of the goals of a mission that involves the system. This capability is applicable for a range of domains and is particularly required for autonomous and highly automated platforms where situational awareness is heavily reliant on sensor information. Other example applications include networks, sensor systems, security, smart grids and fleet operations. The need for systems to operate successfully and safely in a wide range of unknown situations requires that systems are designed for flexibility and resourcefulness and increases the requirements for in-mission reasoning.

A challenging type of in-mission reasoning involves perception of the world and planning of actions. Perception is difficult because the data captured about the world by sensors is typically indirect, incomplete and large. Understanding current system state and planning of actions is complex because prediction of the effects of any action typically depends on a large set of unknown variables, temporal factors and system configuration.

One approach to safe operation of a system is to intelligently respond to in-mission component failures. Here, HIA is important for successful and safe operations of complex systems. Platform mission management is an example of a complex system. A failure or combination of failures at subsystem level results in a loss of capabilities and thus affects the success of the phases and the planned mission. In general, with complex systems subsystem component failures cause capability losses. Missions involving piloted and unmanned vehicles are examples of platform missions.

A mission can be modelled as a series of successive phases. In addition to within-mission phases, at the end of each mission a maintenance opportunity may exist. FIG. 1 shows schematically an example of phased missions 100, 101 in an air-domain scenario, starting with the aircraft 102 taking off 104, performing climbing 106 and cruising 108 manoeuvres before performing surveillance 110 and then descending 112 and landing 114. A maintenance operation 116 can take place before the take-off phase 118 of the second mission 101 commences. During the mission, HIA needs to determine if there are component failures, predict impact on the system's current and future capabilities and impact on the mission plan.

The main known approach for piloted vehicles depends on the perception and decision making skills of the pilots. Instruments and warning lights support the perception of component failures. The procedures in the normal, abnormal and emergency checklists support the decision making. This approach is highly dependent on the pilot. The complexity of the systems makes the task difficult. A potential limitation of the known pilot centric scenario is that there is no warning of future problems. Usually the approach is limited only to safety related issues.

HIA in the Autonomous Systems Technology Related Airborne Evaluation and Assessment (ASTRAEA 1.5) project (see http://www.astraea.aero/) is an example of a known approach with an unmanned system. This approach considers the measurements generated by sensors for diagnosis of the subsystem components in automated manner. Separately, it assesses the mission impact of the diagnosis. The diagnosis and impact assessment modules are separated and the approach ignores some of the coupling effects of the system variables. This causes some modelling error in posterior probability computation of the coupled system variables. A limitation of this known unmanned approach is that it does not use previous symptoms during the diagnosis. Additionally, in uncertain situations the impact assessment can be pessimistic (as possibility of multiple failures is overestimated). This can result in false positives (false alarms) when making decisions based on the posterior probabilities.

Predicting mission impacts is computationally challenging because deduction is not possible, the impact model is complex and the pre-computed rules are not possible. Deduction is not possible because of unknown variable states. The exact failure(s) are often unknown. Certain built in tests (BIT) are only available in certain modes. In addition, future events are unknown. The impact model is complex because reliability fault trees which encode the impact depend on combination of failures (for example redundancy) and many possible combinations have to be considered. The fact that the effects propagate through time creates even more possible combinations. Pre-computed rules are not feasible because of the number of rules required. The number of possible inputs to HIA in these problems is very high due to the number of possible symptom observations throughout a mission in addition the impact logic can depend on system configuration.

US2007/0113235A1 relates to adaptive mission profiling. FIG. 2 of that document shows a flowchart of a process for generating an integrated mission model, in which operational node models, human models and system models are integrated. As mentioned in paragraph [0031], human activities (human models) and system functions (system models) can be mapped to operational activities (operational node models). These integrated mission models do not model system behaviour in terms of the presence or absence of component failure and the model is not in the form of discrete probabilistic graphical model.

US2007/0118502A1 discloses methods and systems for a mission planning system for a fleet of assets. FIG. 3 of that document shows a schematic data flow diagram of an exemplary fleet asset management system that may be used with the fleet mission planning. As mentioned in paragraph [0021], a mission model is configured to receive historical data and threshold data from database. In the exemplary embodiment, the mission model includes a route model to determine task sequences. The life estimation model can determine life remaining in the asset given the historical data received corresponding to the asset. The mission planning system is at fleet of assets (i.e. fleet of vehicles) level. Thus, it can be used as a high-level planning system. It does not model system behaviour in terms of the presence or absence of component failure and the model is not in the form of discrete probabilistic graphical model.

Embodiments of the present invention are intended to address at least some of the problems discussed above. Embodiments of the present invention provide a HIA that uses a single combined model of the planned mission and is designed and applied on the vehicle mission and maintenance. The diagnosis part of the model can be combined with the impact assessment part of the model. This single model can be compiled before a mission.

According to a first aspect of the present invention there is provided a method of assessing performance (e.g. by generating probability data for use in such assessing) of a system and a mission involving the system, the method including or comprising:

receiving a combined model describing a system diagnosis model that describes symptoms, failures and link strengths (conditionals) of components/subsystems of the system, and a mission impact model, the mission impact model describing effects of the system on an ability to perform the mission;

receiving observation data regarding a state of the system, and using the observation data in combination with the combined model to generate probability data for use in assessing performance of the system and the mission.

The observation data may be received from at least one sensor. The combined model may indicate if a particular said phase of the mission is affectable by a said subsystem/component failure and a said subsystem/component symptom. The combined model may be a hierarchical model in which a top level represents the mission. A level below the mission top level may represent at least one phase of the mission, wherein successful performance of the at least one phase affects whether or not the mission is successfully performed. A level below the at least one phase level may represent at least one capability of the system, wherein successful provision of a said capability the affects whether or not the phase is successfully performed. A level below the at least one capability level may represent a subsystem including at least one subsystem/component, wherein successful functioning of the subsystem/component affects whether or not a said capability is successfully provided.

The method may include:

receiving diagnosis model data describing the symptoms, the failures and the link strengths (conditionals) of the components/subsystems of the system;

receiving mission impact model data describing effects of the system on the ability to perform the mission, and processing the receiving diagnosis model data and the mission impact model data to produce the combined model.

The combined model data may be produced by compiling the system diagnosis model data and the mission impact model data into an Arithmetic Circuit.

The method may include:

computing a first prior probability of each said failure at commencement of the mission;

computing a second priori probability of the failure from the commencement of the mission to a said phase that the combined model indicates is affectable by the failure, and storing the computed second prior probability in the combined model.

The prior probability of each failure at a beginning of the mission can be calculated using a Mean Time Between Failure (MTBF) and subsystem/component cumulative operation time before the commencement of the mission. The step of using the observation data in combination with the combined model may include performing inference to compute: posterior probability of the mission failing, posterior probability of a said phase of the mission failing; posterior probability of said capability failing and/or posterior probability of a said subsystem/component failing.

The combined model may be generated offline prior to the receiving and the using of the observation data.

The system may include at least part of a vehicle, such as an aircraft, which may be at least partially autonomous. The generated probability data may be used to assess performance of the system and the mission and a result of the assessment may result in an action being performed, the action being selected from a set including: an alarm being triggered; affecting a control of the vehicle; switching to a backup system.

According to a further aspect of the present invention there is provided a method of generating a combined model describing a system diagnosis model and a mission impact model, the method including or comprising:

receiving diagnosis model data describing symptoms, failures and link strengths (conditionals) of components/subsystems of the system;

receiving mission impact model data describing effects of the system on an ability to perform the mission, and processing the receiving diagnosis model data and the mission impact model data to produce the combined model.

According to other aspects of the present invention there are provided apparatus configured to execute methods substantially as described herein.

According to other aspects of the present invention there are provided computer program elements comprising: computer code means to make the computer execute methods substantially as described herein. The element may comprise a computer program product.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

FIG. 1 schematically illustrates phases of an example mission involving an aircraft;

Figure 2:
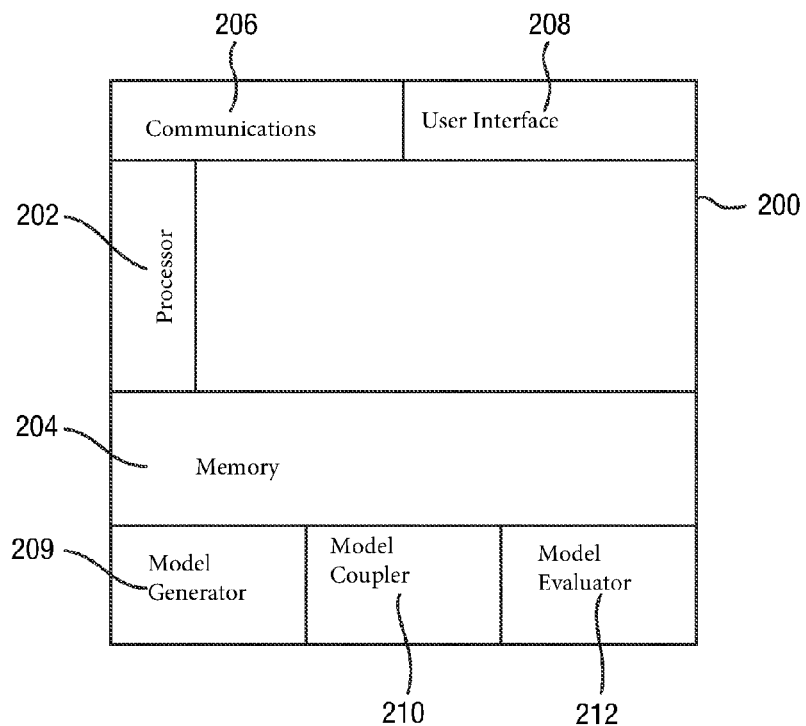
FIG. 2 is a block diagram of a system configured to provide HIA for a system and a mission involving that system.

Referring to FIG. 2, an example computing device 200 is shown. The device includes conventional features of a computing device, such as a processor 202, memory 204, communications 206 and user interface 208, etc, which need not be described herein in detail. The device is configured (e.g. in the form of stored code executing on its processor) to provide combined model generator 209 functionality; model compiler 210 functionality and model evaluator 212 functionality. It will be appreciated that in alternative embodiments, some of the components and/or functions of the computing device could be distributed over two or more computing devices.

Figure 3:
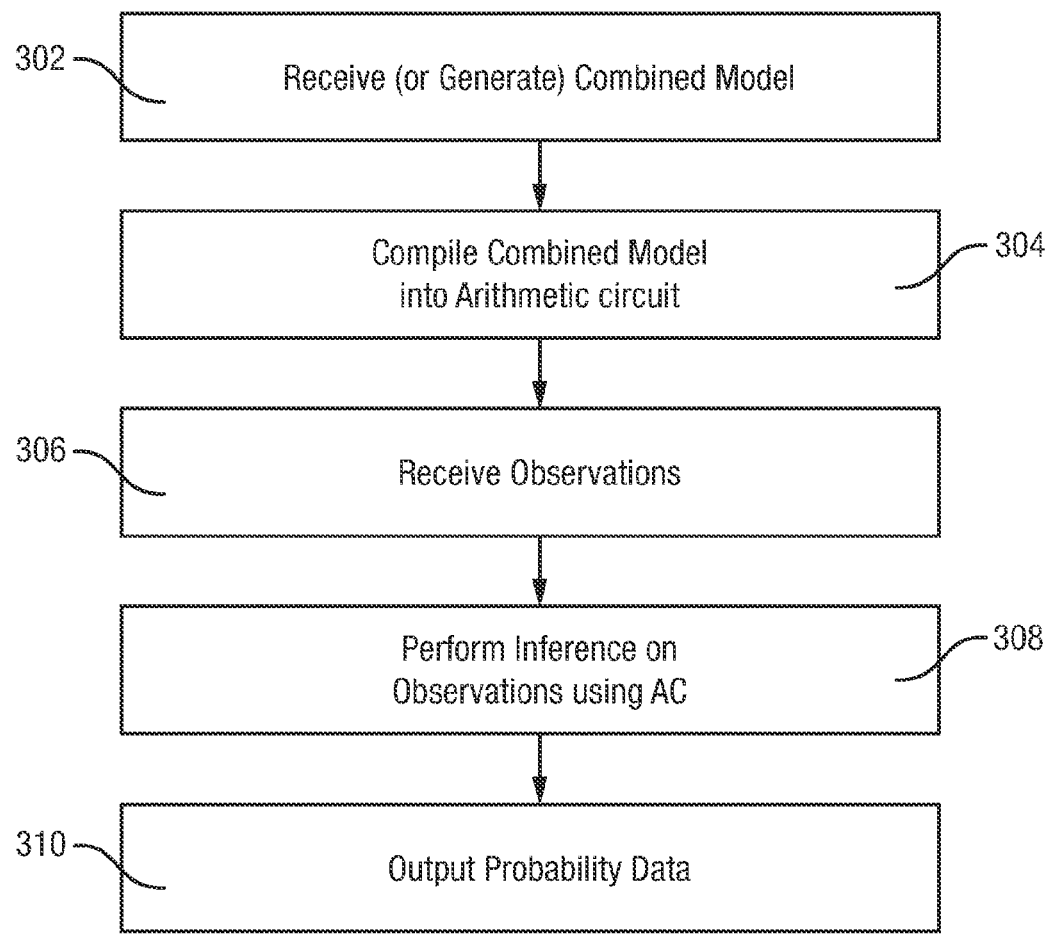
FIG. 3 is a flowchart illustrating overall operation of the HIA system, including combined model generation, Arithmetic Circuit (AC) compilation and inference steps.

FIG. 3 is a flowchart that illustrates how the computing device 200 is normally used. It will be understood that the flowcharts shown herein are exemplary only and in other embodiments some of the steps can be omitted and/or re-ordered. The steps can be implemented using any suitable programming language and data structures. At step 302 data describing a combined system diagnosis and mission impact model is received (or generated by the combined model generator 209). The combined model generated is used directly as an input to compile a corresponding Arithmetic Circuit (AC) at step 304 by the model compiler 210. Step 304 may be performed "off line" so that the AC is ready for use later on. The subsequent steps can be performed "online" using live/real-time observation data. At step 306, the model evaluator 212 receives observations regarding the state of the system (e.g. from at least one sensor (which may be on/in, or remote from, the system) or user-inputted observation) and at step 308 performs inference computation on this observation data using the AC. At step 310 the resulting probability values are output and can, for example, be displayed and/or used as described below.

Figure 4:
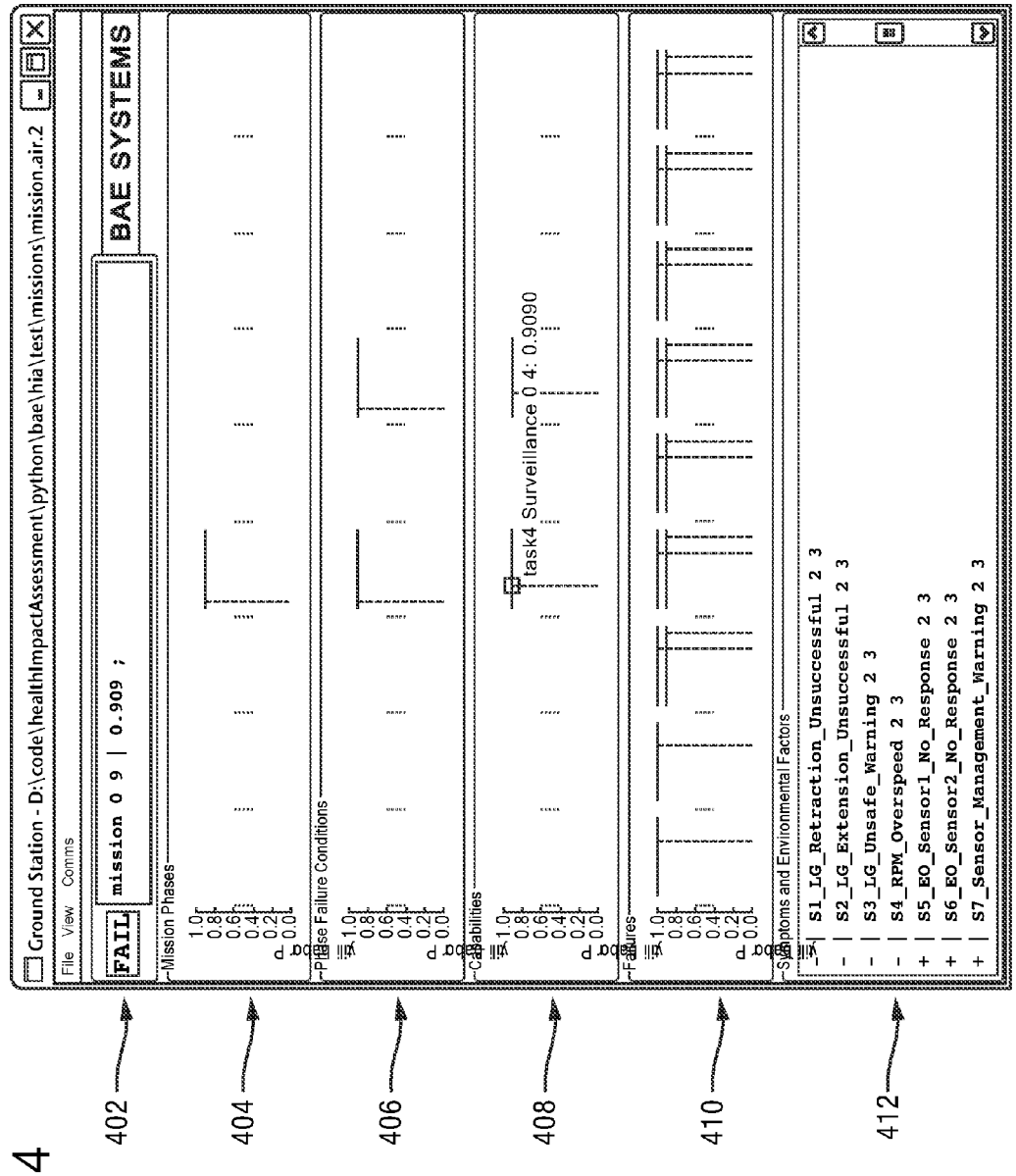
FIG. 4 is an example display showing an output of the HIA system.

The computing device 200, or another computing device provided with the output, can display the output 310. The output can include: the posterior probability of the mission failure, phase failure, capability failure and/or component failures. It may also display the observed symptoms. FIG. 4 shows an example output display, although it will be understood that many variations in its presentation (graphically and/or textually) are possible. In the example, the first line 402 gives posterior probability of the mission failure. Here, the mission status is indicated as "Fail" or "Pass". The second line 404 is reserved for the mission phases. A mission phase will succeed if the required capabilities are available and the previous phases succeeded. The graph in 404 presents bar charts of the posteriors within the mission phases. The phases are separated by vertical lines. The third line 406 shows the posterior graphs of the phase failure conditions which encode if the required capabilities are available for each phase. The fourth line 408 corresponds to the posterior graphs of the capability (task) failures. The fifth line 410 presents to the posterior graphs of the component failures. The last set of lines 412 displays the symptom observations (The prefix + indicates presence; − indicates absence). In this example, symptoms "S5_EO_Sensor1_No_Response", "S6_EO_Sensor2_No_Response" and "S7_Sensor_Management_Warning" are present at phase 3. The posterior probability of the component failures "F4_EO_Sensor1_Failure" and "F5_EO_Sensor2_Failure" are high within and after phase 1 and phase 3, respectively. The capability "task4_Surveillance" is expected to be lost at phase 4. Here, the fourth phase of the mission is predicted to fail and thus the mission is expected to fail.

The probability data output at step 310 may be used to directly control at least one item of hardware (not illustrated) external to, or in communication with, the computer device 200. The health assessment system implemented by the computer device can assess the failure of components at the current and future mission phases, loss of required capabilities, high level failure of planned mission phases, and high level failure of the mission plan. As mentioned above, these assessments can be based on measurements/observations received from hardware sensors installed on a vehicle for example an aircraft. In some embodiments, the sensor measurements can be compared to at least one threshold to yield discrete states which are combined to form symptoms which are used as input to the health assessment. These types of assessments can be used to set an appropriate alarm which could be displayed or provided to an operator or a mission system of a vehicle, such as an autonomous air vehicle (e.g. if the system determines that an important system component is likely to fail and have a detrimental effect on the mission). Further, if the assessment indicates to the system that a failure of a component or loss of a required capability is likely then this could be used to affect a control system, for example, automatically switch to a backup system. The assessed failure of a planned mission phase could initiate separate automatic re-planning system, which can affect the control of the autonomous vehicle, or the assessment could be used to indicate to an operator that re-planning is required. Missions are modelled with reference to a reusable library of model files. The known Open Systems Architecture for Condition-Based Maintenance (OSA-CBM) is adopted in the present embodiment as a standard structure for the on-line communications. According to the OSA-CBM, top down system levels are "Presentation", "Decision Support", "Prognostics", "Health Assessment", "State Detection", "Data Manipulation" and "Data Acquisition". In the present embodiment, HIA models have the "mission" modules which correspond to the "Decision Support"; "phase" and "capability" modules which correspond to the "Prognostics"; and "subsystem" modules which correspond to the "Health Assessment". Hierarchically, the mission module is at the top level, followed by the phase module, the capability module and then the subsystem modules. Impact assessment covers the "mission" and "phase" modules, whilst capability assessment covers the "capability" modules; and diagnosis covers the "subsystem" modules.

Figure 5:
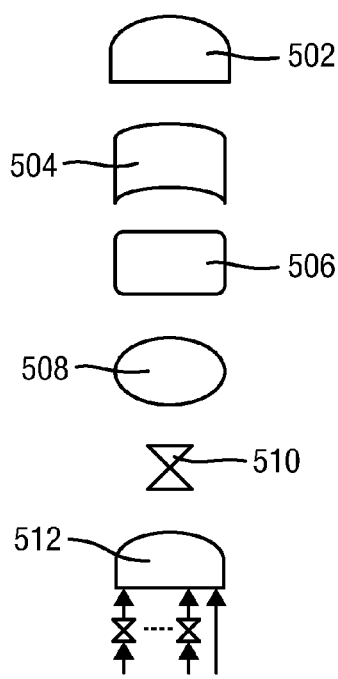
FIG. 5 illustrates node types used in a graphical model that can be converted into a combined model for use by the HIA system.

In the present embodiment, a combined mission model approach is used because this avoids the modelling assumptions of separated/chained models. This approach combines impact assessment, capability assessment and diagnosis. The graphical model used as the basis for the combined model can consist of basic nodes and gates. Examples of these are shown in FIG. 5: AND gate 502; OR gate 504; LEAF node 506; NOISY-OR node 508; NOT gate 510 and MISSION-PHASE node 512.

A variable represented by an AND node 502 fails when all of the inputs associated with it fail. A variable represented by an OR node 504 fails when one of the input variables associated with it fails. LEAF nodes 506 are the top nodes which do not have inputs in the graphical model. Component failures are examples of this type of nodes. A NOISY-OR node 508 is a special form of node widely used in Bayesian Networks. This node has link strengths (conditionals) in-between the inputs and the node. Symptoms are examples of this type of node. The NOISY-OR node also has an optional input named as 'leak'. A symptom-leak is a probability for a symptom: the probability that the symptom will be observed given that none of the modelled failures are present. Another special form of node is employed for considering the probabilities of success of the previous inputs and the probability of failure of the current input variable. This special node is called the MISSION-PHASE node 512. It consists of NOT gates 510 corresponding to the previous inputs and an AND gate. A variable represented by a MISSION-PHASE node fails when all of the previous inputs associated with it pass (not fail) and the current input fails.

In the graphical model, the MISSION-PHASE nodes 512 appear between the PHASE nodes and the MISSION node, where the MISSION node is an OR node representing the overall mission. Thus, the failure of the overall mission depends on the failure of any MISSION-PHASE node variables. Failure of a MISSION-PHASE node depends of the success of the previous phases and failure of the current phase.

Figure 6:
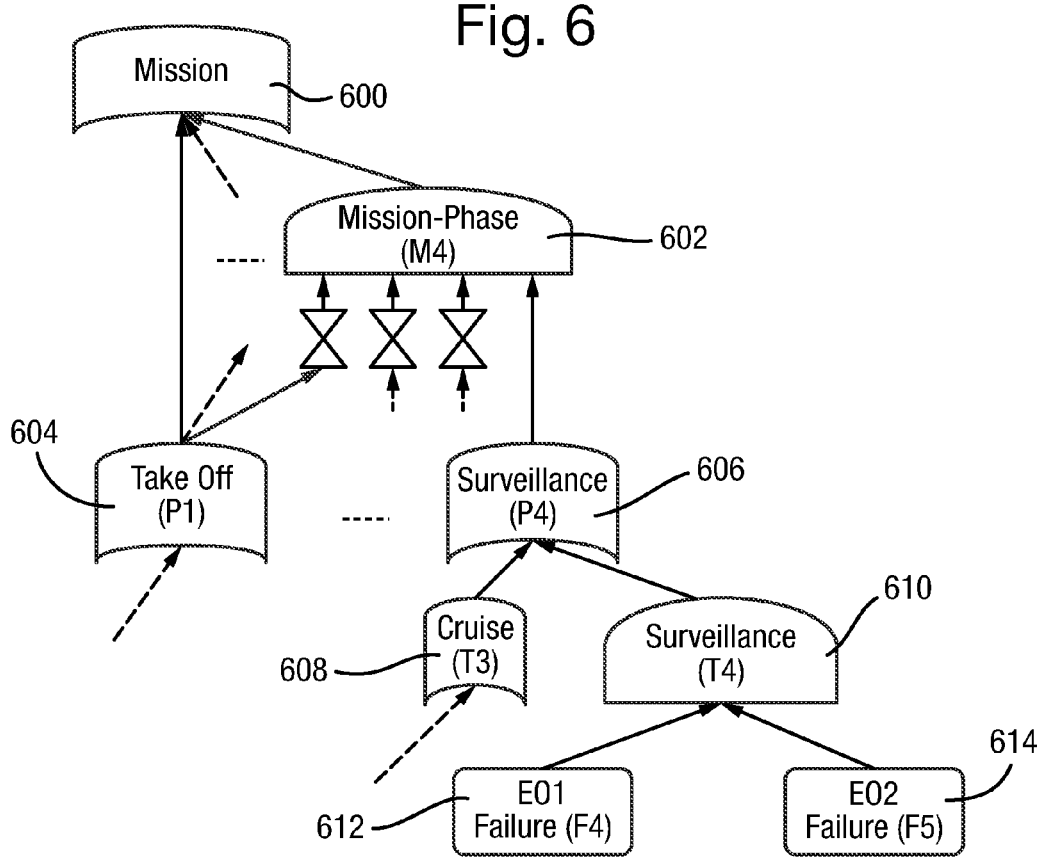
FIG. 6 is a graph illustrating a top part of an example graphical model.

Top down analysis, Fault Tree Analysis (FTA), of the models deals with the impact assessment and capability assessment aspect of the model. In order to illustrate the high-level dependencies, reference is made to the phased mission given in FIG. 1 as an example. In this example, the fourth phase of the mission is "Surveillance (P4)". In order to illustrate the detail of the dependencies of this phase, the top part of a corresponding sample model is shown in FIG. 6. The mission node 600 has a dependent mission-phase node 602 ("M4") and dependent phase nodes of this node include "Take Off (P1)" node 604 and the "Surveillance (P4)" node 606. Node 606 has the dependent capabilities or tasks of "Cruise (T3)" node 608 and "Surveillance (T4)" node 610. Here, the "Surveillance (T4)" task has the subsystem or component failures of "EO1_Failure (F4)" node 612 and "EO2_Failure (F5)" node 614.

Figure 7:
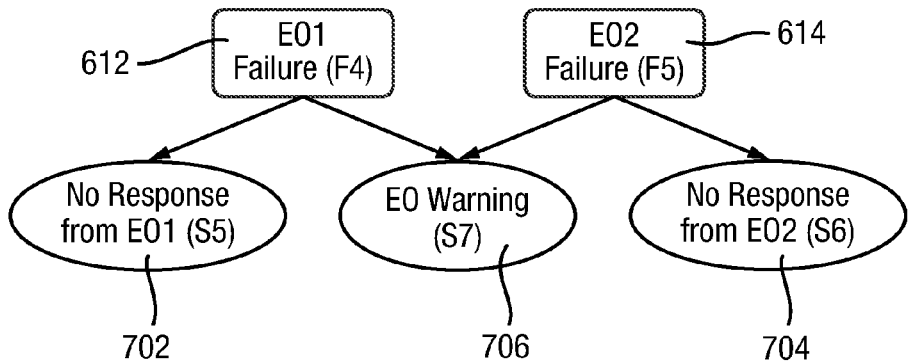
FIG. 7 is an example graph illustrating bottom up Failure Modes and Effects Analysis (FMEA) of the graph of FIG. 6.
Figure 8:
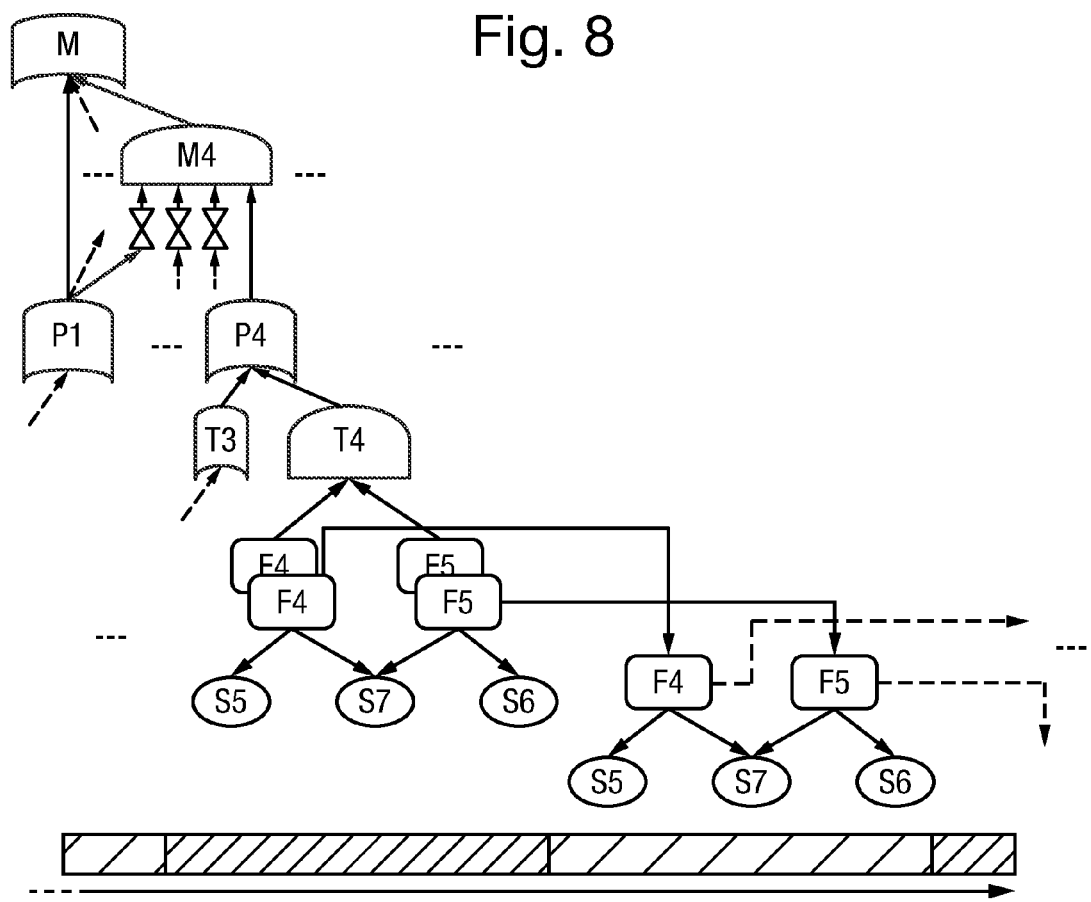
FIG. 8 is an example graph illustrating a combined model generated from the graphs of FIGS. 6 and 7.

Bottom up analysis (using FMEA) of the models deals with diagnosis aspects. FIG. 7 illustrates the bottom up analysis on a sample part of the model of FIG. 6. Here, sensor failures have symptoms "S5" node 702, "S6" node 704 and "S7" node 706. The symptom "S7: EO Warning" is a common symptom for both of the failures 612 and 614. In the present embodiment, the top down aspects and the bottom up aspects are combined into one model. In addition, symptoms from previous time steps are also used for diagnosis. FIG. 8 shows the combined view, a sample part of the mission model.

Figure 9:
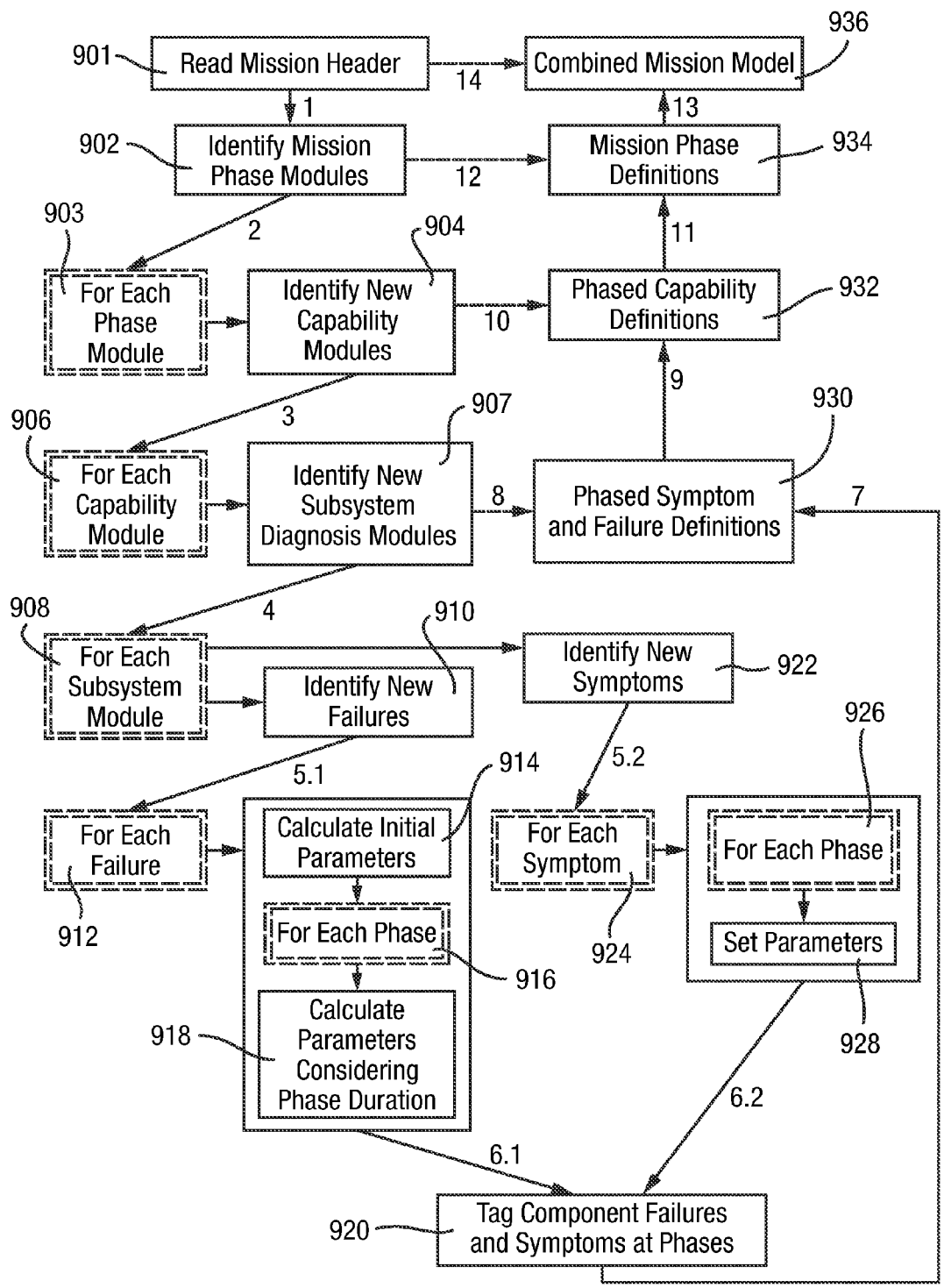
FIG. 9 is a flowchart illustrating steps performed during the generation of the combined model based on a graphical model.

FIG. 9 is a flowchart that illustrates how the combined model generation step 302 can be implemented. The combined model will be generated for separate subsystem diagnosis models, capability models and phased-mission models. The combination may be achieved by the example steps shown in FIG. 9 in an automated manner using the combined model generator module 209. Generally, a user creates a model of each subsystem of the system and the combined model generator combines this with related capability and phased-mission models. The process is performed for each subsystem modelled. The user can prepare the subsystem diagnosis model either by using a tool, such as the Intelligent Fault Diagnosis Toolset produced by BAE Systems, or manually using a graphic/text editor or the like. The combined model generator module 209 generates the combined model considering the input files and the corresponding module definition files. The combined model includes the mission, mission phases, phased capabilities and phased symptoms/failures.

Figure 1:
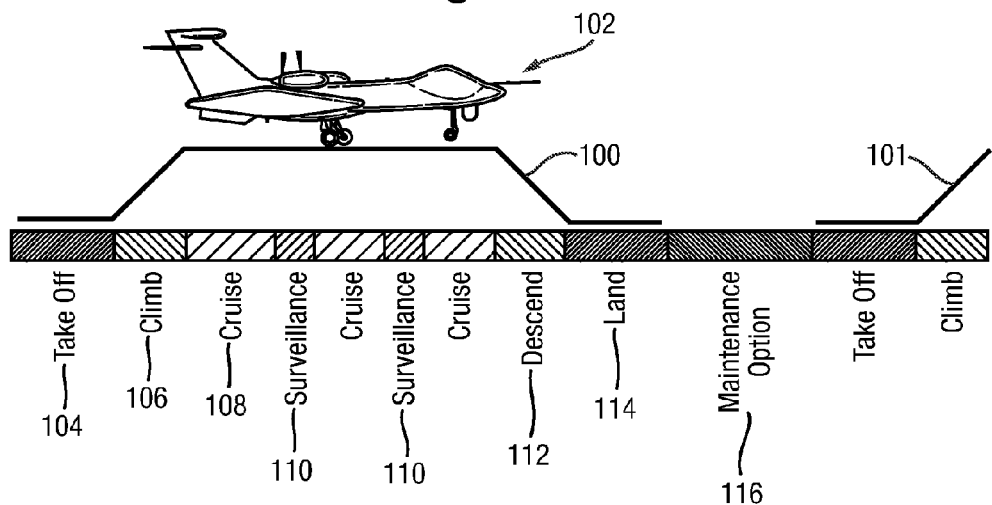

At step 901 the combined model generator module 209 reads the header of a data file representing the mission to be performed. Users can produce files (e.g. in XML format) for each phased mission and the capability dependencies can be described in such files. Example content of a file for the first mission 100 illustrated in FIG. 1 is given below. This high level mission input file includes the mission header (step 901) and the mission-phase identities (see step 902 below).

```xml
<?xml version="1.0" encoding="UTF-8"?>
<BooleanLogicDefinitions>
    <definitions>
        <def id="mission" type="or" tag="mission">
            <ref id="phase1_TakeOff"/>
            <ref id="missionphase2_Climb"/>
            <ref id="missionphase3_Cruise"/>
            <ref id="missionphase4_Surveillance"/>
            <ref id="missionphase5_Cruise"/>
            <ref id="missionphase6_Surveillance"/>
            <ref id="missionphase7_Cruise"/>
            <ref id="missionphase8_Descend"/>
            <ref id="missionphase9_Land"/>
        </def>
        <def id="missionphase2_Climb" type="nand-and" tag="missionphase">
            <ref id="phase1_TakeOff"/>
            <ref id="phase2_Climb"/>
        </def>
        <def id="missionphase3_Cruise" type="nand-and" tag="missionphase">
            <ref id="phase1_TakeOff"/>
            <ref id="phase2_Climb"/>
            <ref id="phase3_Cruise"/>
        </def>
        <def id="missionphase4_Surveillance" type="nand-and" tag="missionphase">
            <ref id="phase1_TakeOff"/>
            <ref id="phase2_Climb"/>
            <ref id="phase3_Cruise"/>
            <ref id="phase4_Surveillance"/>
        </def>
        <def id="missionphase5_Cruise" type="nand-and" tag="missionphase">
            <ref id="phase1_TakeOff"/>
            <ref id="phase2_Climb"/>
            <ref id="phase3_Cruise"/>
            <ref id="phase4_Surveillance"/>
            <ref id="phase5_Cruise"/>
        </def>
        <def id="missionphase6_Surveillance" type="nand-and" tag="missionphase">
            <ref id="phase1_TakeOff"/>
            <ref id="phase2_Climb"/>
            <ref id="phase3_Cruise"/>
            <ref id="phase4_Surveillance"/>
            <ref id="phase5_Cruise"/>
            <ref id="phase6_Surveillance"/>
        </def>
        <def id="missionphase7_Cruise" type="nand-and" tag="missionphase">
            <ref id="phase1_TakeOff"/>
            <ref id="phase2_Climb"/>
            <ref id="phase3_Cruise"/>
            <ref id="phase4_Surveillance"/>
            <ref id="phase5_Cruise"/>
            <ref id="phase6_Surveillance"/>
            <ref id="phase7_Cruise"/>
        </def>
        <def id="missionphase8_Descend" type="nand-and" tag="missionphase">
            <ref id="phase1_TakeOff"/>
            <ref id="phase2_Climb"/>
            <ref id="phase3_Cruise"/>
            <ref id="phase4_Surveillance"/>
            <ref id="phase5_Cruise"/>
            <ref id="phase6_Surveillance"/>
            <ref id="phase7_Cruise"/>
            <ref id="phase8_Descend"/>
        </def>
        <def id="missionphase9_Land" type="nand-and" tag="missionphase">
            <ref id="phase1_TakeOff"/>
            <ref id="phase2_Climb"/>
            <ref id="phase3_Cruise"/>
            <ref id="phase4_Surveillance"/>
            <ref id="phase5_Cruise"/>
```

```
            <ref id="phase6_Surveillance"/>
            <ref id="phase7_Cruise"/>
            <ref id="phase8_Descend"/>
            <ref id="phase9_Land"/>
        </def>
    </definitions>
    <modules>
        <mod id="phase1_TakeOff" duration="60"/>
        <mod id="phase2_Climb" duration="300"/>
        <mod id="phase3_Cruise" duration="600"/>
        <mod id="phase4_Surveillance" duration="300"/>
        <mod id="phase5_Cruise" duration="600"/>
        <mod id="phase6_Surveillance" duration="300"/>
        <mod id="phase7_Cruise" duration="600"/>
        <mod id="phase8_Descend" duration="300"/>
        <mod id="phase9_Land" duration="60"/>
    </modules>
</BooleanLogicDefinitions>
```

At step 902 mission phase modules in the header are identified. Step 903 marks the start of a loop of steps performed for each identified phase module, which can be stored in another file. Example file content for phase 4 (surveillance) of the mission 100 is given below:

```
<?xml version="1.0" encoding="UTF-8"?>
<BooleanLogicDefinitions>
    <definitions>
        <def id="phase4_Surveillance" type="or" tag="phase">
            <ref id="task3_Cruise"/>
            <ref id="task4_Surveillance"/>
        </def>
    </definitions>
    <modules>
        <mod id="task3_Cruise"/>
        <mod id="task4_Surveillance"/>
    </modules>
</BooleanLogicDefinitions>
```

Following step 903, at step 904 each new (i.e. one that hasn't been processed by this routine already) task/capability module in the phase module being processed is identified and control passes to step 906, which marks the start of a loop performed for each identified capability module. Example file content for the surveillance task 4 of the mission 100 is given below:

```
<?xml version="1.0" encoding="UTF-8"?>
<BooleanLogicDefinitions>
    <definitions>
        <def id="task4_Surveillance" type="and"
description="Surveillance" tag="task">
            <ref id="F4_EO_Sensor1_Failure"/>
            <ref id="F5_EO_Sensor2_Failure"/>
        </def>
    </definitions>
    <modules>
        <mod id="Model1ForDiagnosis"/>
        <mod id="Model2ForDiagnosis"/>
        <mod id="Model3ForDiagnosis"/>
    </modules>
</BooleanLogicDefinitions>
```

After step 906, control passes to step 907, where subsystem diagnosis modules in the capability module being processed are identified. Example file content for a subsystem diagnosis of the mission 100 is given below:

```
<?xml version="1.0" encoding="UTF-8"?>
<BooleanLogicDefinitions>
    <definitions>
        <def id="S5_EO_Sensor1_No_Response" type="noisy-or"
leak="1E-5" description="EO Sensor1 does not give response"
tag="symptom">
            <ref id="F4_EO_Sensor1_Failure" link="0.9999"/>
        </def>
        <def id="S6_EO_Sensor2_No_Response" type="noisy-or"
leak="1E-5" description="EO Sensor2 does not give response"
tag="symptom">
            <ref id="F5_EO_Sensor2_Failure" link="0.9999"/>
        </def>
        <def id="S7_Sensor_Management_Warning" type="noisy-or"
leak="1E-5" description="Sensor management warning is on
for more than 20 seconds" tag="symptom">
            <ref id="F4_EO_Sensor1_Failure" link="0.9999"/>
            <ref id="F5_EO_Sensor2_Failure" link="0.9999"/>
        </def>
    </definitions>
    <variables>
        <var id="F4_EO_Sensor1_Failure" mtbf="6.1317E+8"
opTime="61320" distribution="1" description="EO Sensor1
failure" tag="failure"/>
        <var id="F5_EO_Sensor2_Failure" mtbf="6.1317E+8"
opTime="61320" distribution="1" description="EO Sensor2
failure" tag="failure"/>
    </variables>
</BooleanLogicDefinitions>
```

Step 908 marks the start of a loop for each identified subsystem. Control passes from step 908 to step 910 where the new failure identified with the subsystem module being processed is identified. Step 912 marks the start of a loop for each identified failure (e.g. F4_EO_Sensor1_Failure in the example above). After step 912, control passes to step 914. The "initial parameter" of each failure, i.e. the prior probability of each failure at the beginning of the mission, is calculated at step 914. This can be calculated using the Mean Time Between Failure (MTBF) and the component cumulative operation time before the current mission. Step 916 marks the start of a loop for each phase. After step 916, control passes to step 918 where for each phase, these "parameters" (i.e. the prior probabilities of the failures) are revised considering the time from the beginning of the mission to the phase of interest. Thus, step 916 marks the start of a loop for each phase in the failure module and at step 918 the parameters considering phase duration are calculated. Control then passes to step 920.

After step 908, control passes to step 922, where new symptoms in the subsystems are identified. Step 924 marks the start of a loop performed for each identified symptom. From step 924, control passes to step 926, which marks the start of a loop performed for each phase in the symptom being processed. From step 926, control passes to step 928, which sets the symptom parameters. These parameters are the link strengths (conditionals) between the failures and symptoms, and the symptom leak probabilities identified in the subsystem diagnosis model. After steps 918 and 928 have been completed, control passes to step 920, where component failure and symptoms at phases are tagged. The component failures and symptoms are tagged considering their validity at a phase or up to the end of a phase. In order to create the tags, two postfixes are added at the end of the failure name or symptom name: the first postfix indicating the previous phase, and the second postfix indicating the current phase. To illustrate, in a sample scenario, the postfix of a sample tagged symptom, S5_EO_Sensor1_No_Response 2 3, indicates that it covers the time at phase 3. Similarly, in the sample scenario, the postfix of a sample tagged failure, F4_EO_Sensor1_Failure 0 3, indicates that it covers the time up to end of phase 3.

Figure 10:
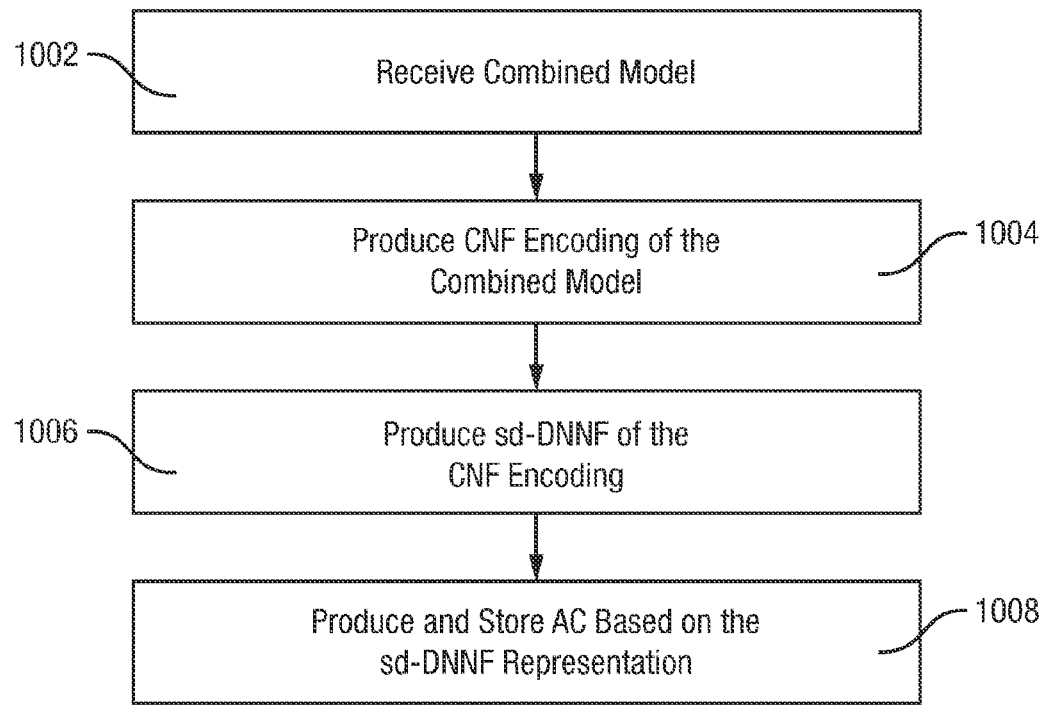
FIG. 10 is a flowchart illustrating steps performed during the AC compilation step.

From step 920, control passes to step 930, where definitions of the phased symptoms and failures are generated. Control also passes to step 930 after no more new subsystem diagnosis modules are identified at step 907. After step 930, control passes to step 932, where definitions for the phased capabilities are generated. Control also passes to step 932 after no more new capability modules are identified at step 904. From step 932, control passes to step 934, where definitions for mission phases are generated. Control also passes to step 934 after no new mission phase modules are identified at step 902. From step 934, control passes to step 936, where the combined mission model is generated and stored. The contents of an example combined mission data file are provided in the accompanying computer program listing appendix on a CD-ROM in MS-Windows, IBM PC/XT/AT compatible format as an ASCII text file named 'MISSION.TXT' (portion also shown schematically in FIG. 8):

FIG. 10 is a flowchart illustrating steps that can be performed at step 304 of FIG. 3, when the model compiler 210 converts the combined model data into an Arithmetic Circuit (AC) that can be used to produce probability values by the inference process performed by the model evaluator 212 at step 308. Inference is a key task for perception and planning. In the present embodiment, inference is computation of the posterior probabilities of the subsystem component failures, capabilities and phases of the missions given some evidence. The background to the approach to inference is given below.

Probability theory provides a framework for solving diagnosis problems. Graphical models (aka Bayesian networks) are a convenient language for encoding the causal relationships between failures (causes) and symptoms (effects) for diagnosis tasks. A restricted form of Bayesian networks with 2 layers and conditional probabilities which follow the noisy-or model (BN2NO) has been used with success to model diagnosis problems in the academic literature (see Heckerman D. (1990), A Tractable Inference Algorithm for Diagnosing Multiple Diseases, Uncertainty in Artificial Intelligence 5, Elsevier, 163-171 or Jaakkola T., Jordan M I. (1999), Variational probabilistic inference and the qmr-dt database, Journal of Artificial Intelligence Research). Inference on BN2NO models can be used to perform vanilla diagnosis (configuration insensitive and single point in time). Exact inference can be performed in run time exponential in the number of present symptoms using the Quickscore algorithm (see the Heckerman article referenced above). Approximate inference trades accuracy for runtime and can be performed using variational inference for BN2NO. However, configuration sensitive diagnosis and incorporating symptom evidence over time cannot be adequately addressed with a BN2NO model, and so the present inventors proposed that they can be addressed by performing inference on a graphical model that is more general than BN2NO. Specifically, these tasks can be modelled by multi level generalisation of BN2NO; multi level Boolean noisy-or networks (BNNO).

The BNNO model is a strict superset of the BN2NO model. The present inventors' approach has been to attempt to find approaches which perform well on BN2NO, but can also be used to perform inference on BNNO. Generalisations of state of the art BN2NO algorithms are considered as strong solutions, these are approaches which reduce to state of the art BN2NO algorithms when applied to 2 layer networks.

A joint expression can be encoded by building a Boolean logic theory which encodes the terms in the joint expression. A number of approaches propose to translate the BNNO model into Boolean logic, then to automatically factorise the resulting Boolean logic. These approaches can then automatically recover the equivalent of the Quickscore factorisation and also achieve generalisations of Quickscore to multi layer models. Inference can be performed by Weighted "Model" Counting (WMC). The term "model" means an instantiation of all of the variables where the instantiation is consistent with the "theory". "Theory" in the terms of the present inventors means the logical encoding of the BNNO model. The encoding is constructed such that there is exactly one "model" for each term in the likelihood expression (encoded by the graphical model). When appropriate weights are applied the sum of weighted "models" is equal to computing the sum of the terms in the likelihood expression. Within a joint probability table, there is a row for every possible instantiation of the variables; a "model" corresponds to any row where the row probability is non-zero. A cut set assigns true or false to all variables for a fault tree it is therefore the same as a "model". (An implicant is a set of literals which can be encoded as an assignment of true or false to a subset of variables and is therefore not exactly the same as a "model".)

The BNNO model is encoded into a Boolean logic "theory". For example, Li W., van Beek P., Poupart P. (2008). Exploiting causal independence using weighted model counting. In Proceedings of the AAAI National Conference (AAAI) describes encodings for BNNO. Chavira M., Allen D., Darwiche A. (2005), Exploiting evidence in probabilistic inference, Proceedings of the 21st Conference on Uncertainty in Artificial Intelligence (UAI), pp. 112-119 describe an encoding for any graphical model. The present inventors determined that a compilation approach was expected to provide faster and more straightforward on-line inference (at the cost of off-line compilation process). They considered approaches which compile the CNF and then perform WMC on the compiled structure. Ordered Binary Decision Diagrams (OBDD) and deterministic, decomposable negation normal forms (d-DNNF) were also considered as two possible compiled structures (target languages for the compiler). A literature survey performed by the inventors concluded that the sd-DNNF approach should be implemented. The Boolean logic encoding of the BNNO is compiled to a restricted form of logic, called smooth deterministic Decomposable Negation Normal Form (sd-DNNF), which enables efficient inference. A Generation 2 compiler (see Darwiche A. (2002). A compiler for deterministic, decomposable negation normal form, AAAI-02 Proceedings, AAAI (www.aaai.org), 627-634) was implemented within embodiments of the present system.

Figure 11:
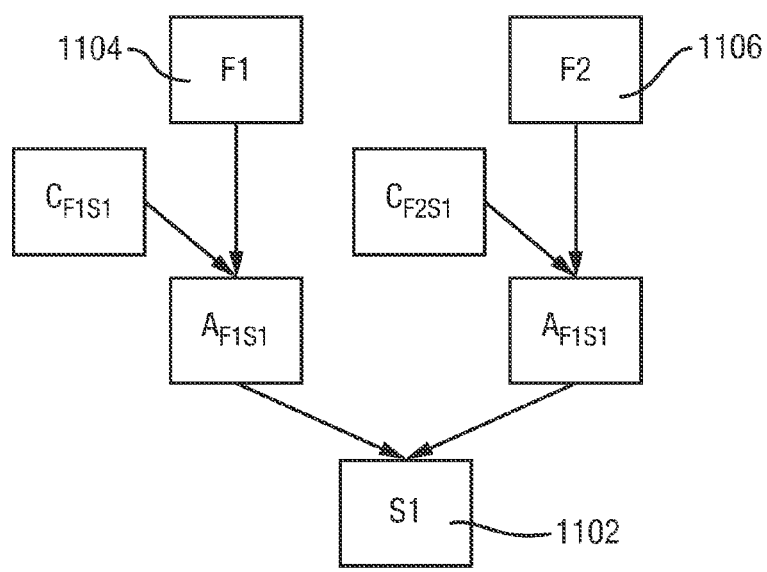
FIG. 11 shows a part of an example BN2NO model used during generation of the AC.

Returning to FIG. 10, at step 1002, combined model data is received (this could be model data that has been generated using the process of FIG. 9). At step 1004, a Conjunctive Normal Form (CNF) encoding of the combined model data is produced. An example will now be given to illustrate how this conversion can be performed. FIG. 11 shows a part of a BN2NO model for one symptom (S1) 1102 and two failures, F1 (1104) and F2 (1106). The conditional probability distribution relating the failures to the symptom follows the noisy-or model. The noisy-or causal model has been expanded so that its local structure is evident in the graphical model structure following (see Chavira M., Darwiche A. (2008). On probabilistic inference by weighted model counting, Artificial Intelligence, 172(6-7), April 2008, 772-799). The expanded model suggests an encoding for noisy-or nodes that is similar to the encoding given in (see Li W., van Beek P., Poupart P. (2008). Exploiting causal independence using weighted model counting. In Proceedings of the AAAI National Conference (AAAI). This expansion introduces the "C" condition and "A" auxiliary variables. The noisy-or model states that a failure will cause a symptom only when the condition variable is true, the condition variable may be interpreted as a physical system or environmental state such as "ambient temperature above 30 degrees". In the expanded model the auxiliary variable is an AND gate and the symptom variable is an OR gate.

An indicator variable, I, is introduced for each value of each variable. The indicator variables can be set so that the expression evaluates to any likelihood (probability of a set of evidence) which is equivalent to summing a subset of the joint probability table. A parameter variable, P, is introduced for each value of each root variable. In Table 1 below, the first two rows generate clauses for each variable in the graphical model and the third row generates clauses for every root node.

TABLE 1

General Clauses

| Description | Logic |
|---|---|
| Each variable is either true or false, therefore one of its two indicator variables must be true | $I_x \vee \overline{I_x}$ |
| A variable can not be true and false, therefore the two indicator values cannot both be true | $\neg (I_x \wedge \overline{I_x}) \Rightarrow \overline{I_x} \vee \overline{I_x}$ |
| When an indicator variable appears in a "model" so does its parameter value, this is required to make WMC equivalent to computing the likelihood | $I_x \leftrightarrow P_x \Rightarrow$ $I_x \rightarrow P_x, P_x \rightarrow I_x \Rightarrow$ $\overline{I_x} \vee P_x$ $\overline{P_x} \vee I_x$ |

In Table 2 below, the first row generates clauses for every failure symptom link and the second row generates clauses for every symptom. The second row gives the clauses for an example with two failures; the generalisation to any number of failures is straightforward.

TABLE 2

Noisy-Or Clauses

| Description | Logic |
|---|---|
| The auxiliary variable is an AND gate | $I_A \leftrightarrow I_F \wedge I_C \Rightarrow$ $I_A \leftrightarrow I_F \wedge I_C$ $I_F \wedge I_C \rightarrow I_A \Rightarrow$ $(\overline{I_A} \vee I_F) \wedge (\overline{I_A} \vee I_C)$ $\overline{I_F} \vee \overline{I_C} \vee I_A$ |
| The symptom variable is an OR gate | $I_S \leftrightarrow I_{A1} \vee I_{A2} \Rightarrow$ $I_S \leftrightarrow I_{A1} \vee I_{A2}$ $I_{A1} \vee I_{A2} \rightarrow I_S \Rightarrow$ $\overline{I_S} \vee I_{A1} \vee I_{A2}$ $(\overline{I_{A1}} \vee I_S) \wedge (\overline{I_{A2}} \vee I_S)$ |

The conjunction of the clauses from the logic columns in Table 1 and Table 2 forms the CNF encoding of the BNNO. The CNF encoding has the property that every "model" corresponds to a term in the joint likelihood expression.

At step 1006, a complied smooth deterministic decomposable negation normal form (sd-DNNF) form of the CNF encoding produced at step 1004 is created. The compiled form, sd-DNNF, is a specific and restricted form of logic that enables efficient inference. As mentioned above, a Generation 2 complier can be used. A number of published algorithms can be used to perform this step, e.g. Chavira M., Darwiche A. (2008). On probabilistic inference by weighted model counting, Artificial Intelligence, 172(6-7), April 2008, 772-799. Also, there are alternatives such as OBDD compilers. e.g. BDD for Reliability Studies, A. Rauzy, In K. B. Misra ed., Handbook of Performability Engineering. Elsevier. pp 381-396, 2008.

At step 1008, an AC based on the sd-DNNF is produced and stored for later use in inference. This conversion can be performed using the techniques described in the abovementioned Chavira and Darwiche (2008) article, for example. The compiled AC is the output of the model compiler 210 and the model evaluator 212 takes this compiled AC and observations as its inputs, performs inference (e.g. as described in the abovementioned Chavira and Darwiche (2008) article; an example of a suitable software tool for executing the method is ACE, see http://reasoning.cs.ucla.edu/ace/) and then provides the posterior probabilities of failures of the mission phases, capabilities, and subsystem components.

As a mission progresses through time, failures may occur and subsequently symptom evidence can become available. Symptoms may be hidden in certain system states; for example, the symptom "WHEN radio on, no sound from speaker" is unobservable when the radio is off. This situation means that it makes sense to observe or collect symptom evidence over time. A symptom is a chosen observable feature or pattern which is caused by, and helps to isolate, a failure. Symptoms can involve observing measurements over time for example to determine a trend (e.g. pressure is increasing). The non-replacement model is adopted; a failure occurs at a certain time and remains present. A mission can be decomposed into phases. Within each phase certain capabilities/resources are required. Within the filtering literature there are 3 types of tasks which are performed given all previous measurements:

Estimating the current state (Filtering)
Predicting a future state (Prediction)
Estimating a past state (Smoothing)

The present embodiment is concerned with estimation of the current state for the presentation of failed components. Prediction of future loss of capability is a key task (although prediction of future component failures is not the main focus). Estimation of a past state with current measurements is useful for presenting the (best estimate of the) sequence of failure events which have occurred (so far) during a mission. In the present system, the sequence of the failures has been explicitly captured in terms of the mission phases. This approach can distinguish between the order of failures but leads to larger graphical model, which are therefore harder to use for inference. This approach is able to estimate past states in previous phases. This is combined with multi phase impact assessment. On the other hand, it is unable to distinguish the order of failures within a single phase.

The bottom part of the sample graphical model part in FIG. 8 illustrates the incorporation of evidence during a mission. As an example, the posterior probability of failure "F4" up to phase "P5" depends on the posterior probability of "F4" up to phase "P4" and the one at phase "P5". Within this model symptoms observed in different phases are incorporated in to the assessment during the mission.

The inventors now present the results of an experiment that shows the benefit of the combined model approach. In previous ASTRAEA work, diagnosis and impact assessment were implemented as separate software modules, diagnosis passed the marginal failure probabilities to the impact assessment module and no information was passed in the opposite direction. In contrast, the present approach uses a combined mission model. The diagnosis module is combined with the impact assessment module. This single model can be compiled before a mission. The aim of the integrated scenario experiments is to study the suitability of the selected approach in more realistic scenarios; these scenarios necessarily involve larger models than the first type of experiment. Here, the approach to health management is integrated with other components to form an integrated on-board system exercised against a simulated vehicle in a simulated world. Two platform types and two mission types have been studied. These are land and air scenarios.

Figure 12:
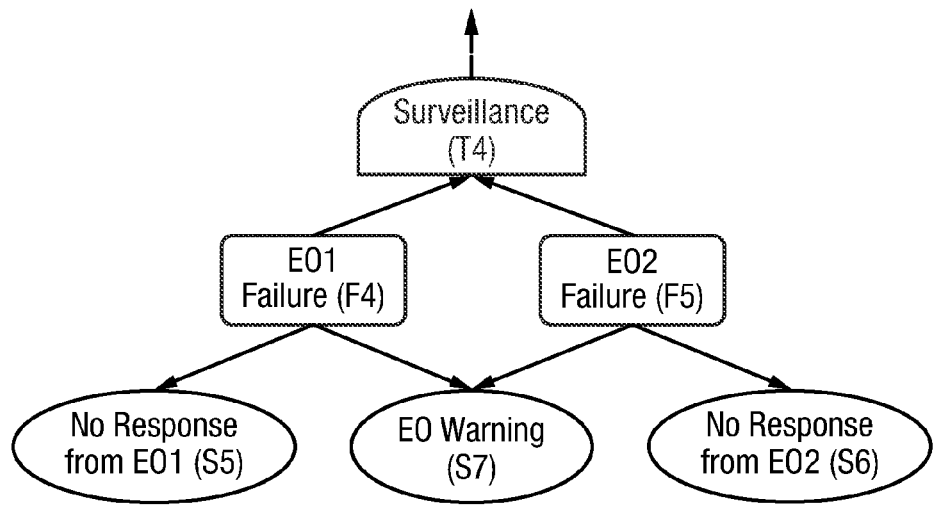
FIG. 12 shows a sample portion of a combined graphical model used in an experiment.

A simple scenario was implemented which was designed to highlight the effects of using a combined model. First, a combined graphical model of the scenario is constructed (GM1) and it is compiled to an arithmetic circuit, AC1. Then, the impact assessment (GM1-a) and diagnosis (GM1-b) parts of the model are separated and they are compiled to arithmetic circuits, AC1-a and AC1-b, respectively. A sample portion of the combined graphical model, GM1, is illustrated in FIG. 12. In the scenario, the probability of failure of a sample capability (T4: Surveillance) has been investigated:

The task T4 has two failure modes: F4: EO1_Failure; F5: EO2_Failure. The joint failure of F4 and F5 leads to the capability loss.

The diagnosis module of the scenario considered three symptoms: S5: No_Response_from_EO1; S6: No_Response_from_EO2; and S7: EO_Warning. Here, S7 is a common symptom for F4 and F5.

Figure 13A:
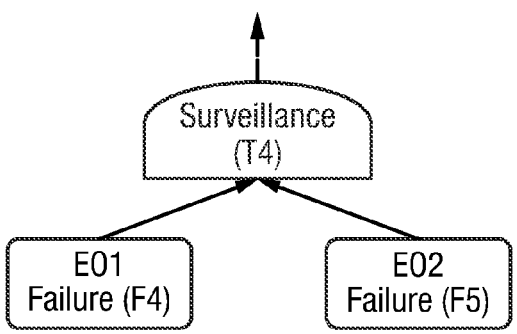
FIG. 13 shows a separated graphical model used for comparison in the experiment.
Figure 13B:
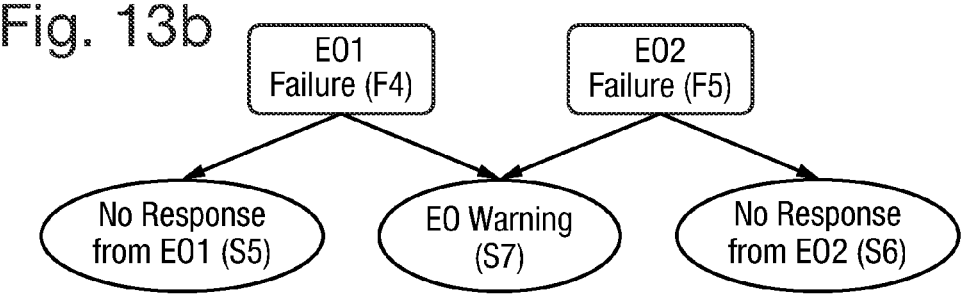

The graphical models (GM1-a and GM1-b) of the separated model is given in FIG. 13. In the combined model, the capability depends on the coupling of the failures, F4 and F5, with the symptoms. However, in the separated model, the coupling is hidden to the capability. Firstly, the prior probability values of the failures are assigned, and then the combined and separated models are compiled. In the experiment, the probability of failure of the capability, T4, has been investigated given the observation of the symptom: S7: True. This observation was applied on the compiled models and then the inference results were recorded. The conventional notation of fault trees was used in definition of posterior probabilities. The posterior probability values of the task and failures were obtained as follows:

TABLE 3

Posterior probabilities obtained in the approaches

| Posteriors | Combined Approach | Separated Approach |
|---|---|---|
| P(T4) | 4.76E−05 | 0.227 |
| P(F4) | 0.476 | 0.476 |
| P(F5) | 0.476 | 0.476 |

Figure 14:
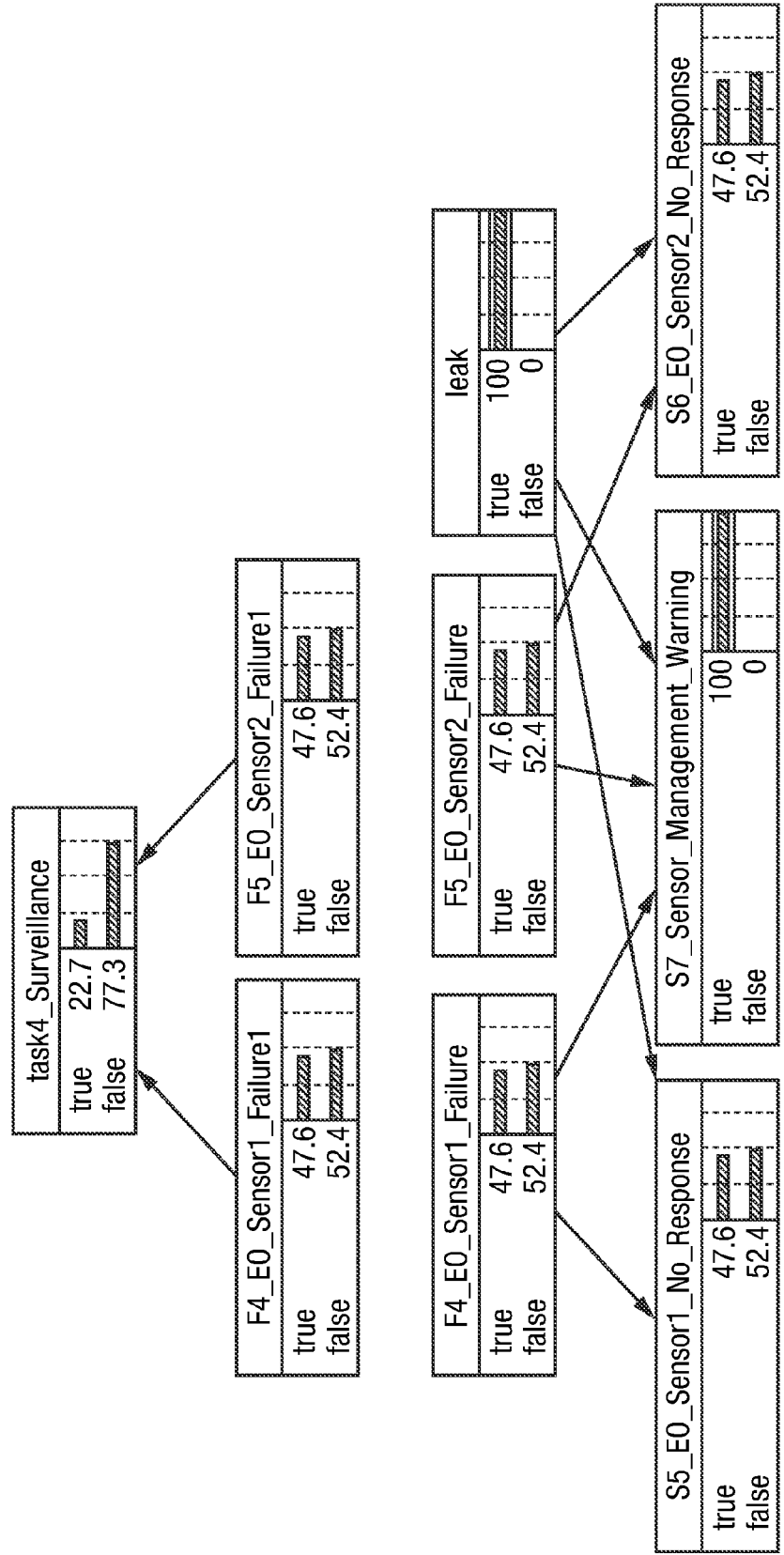
FIGS. 14 and 15 show inference results of the combined and separated models, respectively.
Figure 15:
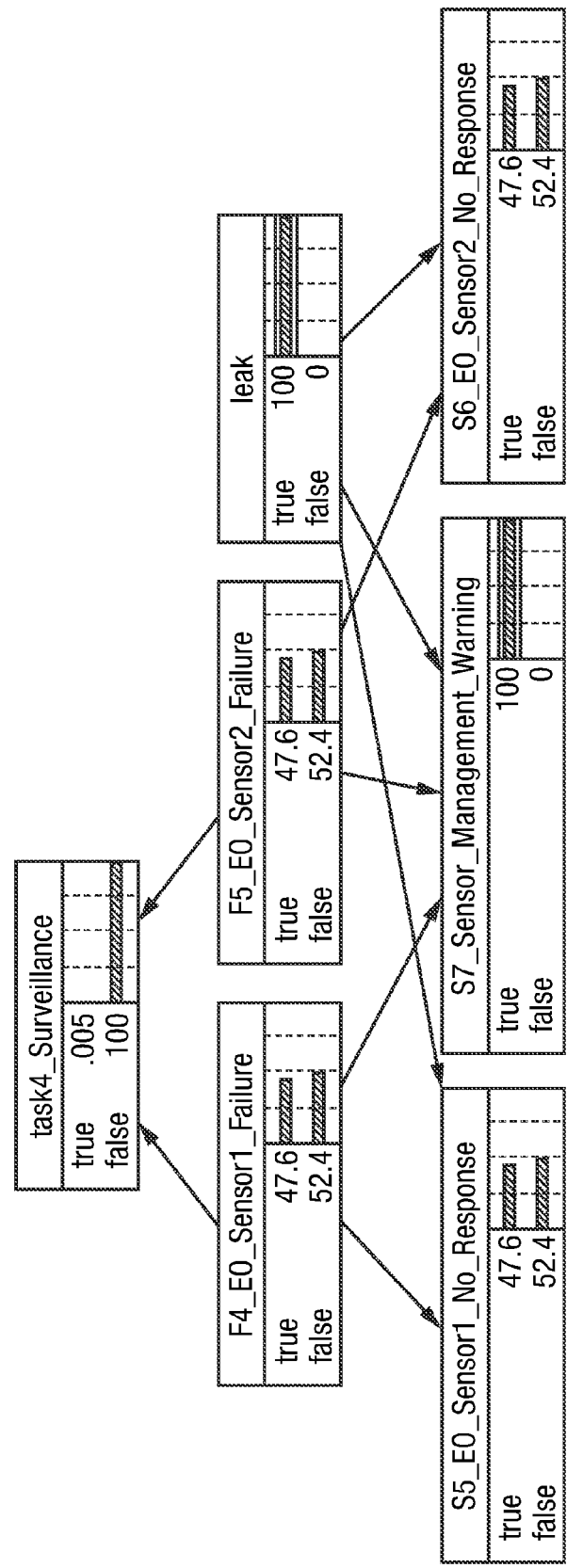

To verify these results, these systems are modelled using another exact inference tool: Netica by Norsys Software Corp. The inference results of the separated and combined models are given in FIG. 14 and FIG. 15, respectively. These results are equal with the results obtained by the HIA inference.

Considering the coupling of the failures with the symptoms and considering the observation: S7: True, the probability of failure of the capability, T4, should be low. The combined approach gave a lower posterior probability for the capability failure when compared with the one in the separated approach because it took the coupling effect into account. However, in the separated model, the redundancy of the system was hidden to the capability assessment. This fact resulted in modelling errors from the separated model. On the other hand, the drawback of the combined approach can be the relatively longer compilation time for large scale system models when compared with the one in separated approach. Compilation is a batch mode operation and in general it is performed before the mission starts. Within the mission, inference is performed and the inference time is typically much lower than the compilation time.

The invention claimed is:

1. A computer-implemented method of assessing performance of a vehicle system and a mission involving the vehicle system, the method including:
   receiving, by a processor, a sensor signal generated by a sensor, the sensor signal representing an operational state of a component of the vehicle system;
   receiving, by the processor, a single combined model describing a system diagnosis model that describes symptoms, failures, and link strengths (conditionals) of the component of the vehicle system, and a mission impact model, the mission impact model describing effects of the component of the vehicle system on an ability of the vehicle system to perform the mission;
   generating, by the processor, probability data representing a probability of a failure of the component affecting the ability of the vehicle system to perform the mission by applying the sensor signal to the single combined model; and
   generating, by the processor, a control signal for controlling the vehicle system based on the probability data.

2. A method according to claim 1, wherein the sensor signal is one of a plurality of sensor signals, each sensor signal received from at least one sensor, and wherein each sensor signal is applied to the single combined model to generate the probability data.

3. A method according to claim 1, wherein the single combined model indicates if a particular phase of the mission is affectable by at least one of the failure of the component and a symptom of the component.

4. A method according to claim 1, wherein the single combined model further comprises a hierarchical model in which a top level represents the mission.

5. A method according to claim 4, wherein a level below the mission top level of the hierarchical model represents at least one phase of the mission, wherein successful performance of the at least one phase affects whether or not the mission is successfully performed.

6. A method according to claim 5, wherein a level below the at least one phase level represents at least one capability of the vehicle system, wherein successful provision of a said capability affects whether or not the phase is successfully performed.

7. A method according to claim 6, wherein a level below the at least one capability level represents the component, wherein successful functioning of the component affects whether or not a said capability is successfully provided.

8. A method according to claim 7, wherein generating the probability data includes performing inference to compute at least one of: posterior probability of the mission failing, posterior probability of a said phase of the mission failing; posterior probability of said capability failing, and posterior probability of a said component failing.

9. A method according to claim 1, further including:
   receiving diagnosis model data describing the symptoms, the failures, and the link strengths (conditionals) of the component;
   receiving mission impact model data describing effects of the system on the ability to perform the mission; and processing the receiving diagnosis model data and the mission impact model data to produce the single combined model.

10. A method according to claim 9, wherein the single combined model is produced by compiling the system diagnosis model data and the mission impact model data into an Arithmetic Circuit.

11. A method according to claim 10, further including:
computing a first prior probability of each said failure at commencement of the mission;
computing a second priori probability of the failure from the commencement of the mission to a said phase that the combined model indicates is affectable by the failure; and
storing the computed second prior probability in the single combined model.

12. A method according to claim 11, wherein the prior probability of each failure at a beginning of the mission is calculated using a Mean Time Between Failure and a component cumulative operation time before commencement of the mission.

13. A non-transitory computer program product having instructions encoded thereon that when executed by one or more processors cause a process to be carried out, the process for assessing performance of a vehicle system and a mission involving the vehicle system, the process comprising:
receiving a single combined model describing a system diagnosis model that describes symptoms, failures, and link strengths (conditionals) of a component of the vehicle system, and a mission impact model, the mission impact model describing effects of the component of the vehicle system on an ability of the vehicle system to perform the mission;
receiving a sensor signal representing an operational state of the component of the vehicle system; and
generating probability data representing a probability of a failure of the component affecting the ability of the vehicle system to perform the mission by applying the sensor signal to the single combined model; and
generating a control signal for controlling the vehicle system based on the probability data.

14. Apparatus for assessing performance of a vehicle system and a mission involving the vehicle system, the apparatus including:
one or more memory devices comprising instructions; and
one or more processors configured to execute the instructions so as to cause a process to be carried out, the process comprising:
receive a single combined model describing a system diagnosis model that describes symptoms, failures, and link strengths (conditionals) of a component of the vehicle system, and a mission impact model, the mission impact model describing effects of the component of the vehicle system on an ability of the vehicle system to perform the mission;
receive a sensor signal representing an operational state of a component of the vehicle system;
generate probability data representing a probability of a failure of the component affecting the ability of the vehicle system to perform the mission by applying the sensor signal to the single combined model; and
generate a control signal for controlling the vehicle system based on the probability data.

15. Apparatus according to claim 14, wherein the generated probability data is used to assess performance of the vehicle system and the mission, and a result of the assessment leads to an action being performed, the action being selected from a set including: an alarm being triggered; affecting a control of the vehicle; switching to a backup system.

16. Apparatus according to claim 14, wherein the apparatus comprises at least one of a sensor configured to generate the sensor signal and part of a vehicle.

17. A non-transitory computer program product according to claim 13, wherein the single combined model indicates if a particular phase of the mission is affectable by at least one of the failure of the component and a symptom of the component.

18. A non-transitory computer program product according to claim 13, wherein the single combined model further comprises a hierarchical model in which a top level represents the mission, and wherein a level below the mission top level of the hierarchical model represents at least one phase of the mission, wherein successful performance of the at least one phase affects whether or not the mission is successfully performed, and wherein a level below the at least one phase level represents at least one capability of the system, wherein successful provision of a said capability affects whether or not the phase is successfully performed, and wherein a level below the at least one capability level represents the component of the system, wherein successful functioning of the component affects whether or not a said capability is successfully provided, and wherein using the observation data in combination with the combined model includes performing inference to compute at least one of: posterior probability of the mission failing, posterior probability of a said phase of the mission failing; posterior probability of said capability failing, and posterior probability of a said component failing.

19. A non-transitory computer program product according to claim 13, the process further including:
receiving diagnosis model data describing the symptoms, the failures, and the link strengths (conditionals) of the component;
receiving mission impact model data describing effects of the system on the ability to perform the mission; and
processing the receiving diagnosis model data and the mission impact model data to produce the single combined model;
wherein the single combined model is produced by compiling the system diagnosis model data and the mission impact model data into an Arithmetic Circuit.

20. A non-transitory computer program product according to claim 19, the process further including:
computing a first prior probability of each said failure at commencement of the mission;
computing a second priori probability of the failure from the commencement of the mission to a said phase that the combined model indicates is affectable by the failure; and
storing the computed second prior probability in the single combined model;
wherein the prior probability of each failure at a beginning of the mission is calculated using a Mean Time Between Failure and a component cumulative operation time before the commencement of the mission.

* * * * *